(12) United States Patent
Liu et al.

(10) Patent No.: US 10,984,561 B2
(45) Date of Patent: Apr. 20, 2021

(54) METHOD FOR COMPRESSING IMAGE AND DEVICE USING THE SAME

(71) Applicant: GlenFly Technology Co., Ltd., Shanghai (CN)

(72) Inventors: Shuoshuo Liu, Shanghai (CN); Yongtao Zhao, Shanghai (CN); Wei Wang, Shanghai (CN)

(73) Assignee: GlenFlyTechnology Co., Ltd., Shanghai (CN)

( * ) Notice: Subject to any disclaimer, the term of this patent is extended or adjusted under 35 U.S.C. 154(b) by 111 days.

(21) Appl. No.: 16/412,457

(22) Filed: May 15, 2019

(65) Prior Publication Data

US 2020/0327704 A1  Oct. 15, 2020

(30) Foreign Application Priority Data

Apr. 10, 2019 (CN) .......................... 201910283606.3

(51) Int. Cl.
*G06T 9/40* (2006.01)
(52) U.S. Cl.
CPC ...................................... *G06T 9/40* (2013.01)
(58) Field of Classification Search
None
See application file for complete search history.

(56) References Cited

U.S. PATENT DOCUMENTS

| | | | | |
|---|---|---|---|---|
| 2002/0176494 A1* | 11/2002 | Zhao | ....................... | H03M 7/40 |
| | | | | 375/240 |
| 2005/0237951 A1* | 10/2005 | Yang | .................... | H04N 19/126 |
| | | | | 370/256 |
| 2017/0347122 A1* | 11/2017 | Chou | ..................... | H04N 19/36 |
| 2020/0374537 A1* | 11/2020 | Makeev | .................. | G06F 30/20 |
| 2020/0389660 A1* | 12/2020 | Makeev | ............... | H04N 19/167 |

* cited by examiner

*Primary Examiner* — Fayyaz Alam
(74) *Attorney, Agent, or Firm* — JCIPRNET (57) ABSTRACT

The disclosure provides a method for image compression and a device using the same method. The method includes: retrieving an image block including pixels, wherein each pixel include a plurality of channel data; defining root nodes according to an image compressing ratio of the image block; categorizing each channel data of each pixel into groups corresponding to the root nodes, wherein a structure of each group is a binary tree; if an empty tree exists in the aforementioned groups, dividing an non-empty tree of the groups into sub-trees and replacing the empty tree and the non-empty tree with the sub-trees to update the groups and the root nodes; building a center value of each group and determining a group index of each channel data of each group; encoding the center value of each group and characterizing each channel data as the corresponding center value and the group index to compress each channel data.

40 Claims, 7 Drawing Sheets

METHOD FOR COMPRESSING IMAGE AND DEVICE USING THE SAME

CROSS-REFERENCE TO RELATED APPLICATION

This application claims the priority benefit of China application serial no. 201910283606.3, filed on Apr. 10, 2019. The entirety of the above-mentioned patent application is hereby incorporated by reference herein and made a part of this specification.

BACKGROUND

Technical Field

The disclosure relates to a method for image compression and a device using the same. More particularly, the disclosure relates to a method for image compression based on a binary tree principle and a device using the same.

Description of Related Art

Among currently available techniques, image compression is generally performed to compress an image by utilizing spatial redundancy or inter-channel redundancy. However, a data difference existing in a part of blocks of the image may be too large so that almost no redundancy exists between the spaces or channels. In this situation, it may be difficult to obtain preferable compression quality by a conventional method for image compression, such that greater distortion or deviation may appear to a part of the data after being compressed. Generally, the greater deviation appears mostly due to errors occurring to a plurality of most significant bits (MSBs) after channel data is compressed.

Thus, for a person skilled in the art, how to design a mechanism for image compression capable of assuring lossless encoding of the data of the MSBs as much as possible for the situation of the great data difference in the image block is really important.

SUMMARY

Accordingly, the disclosure provides a method for image compression and a device using the same capable of improving quality of the image compression by preserving a plurality of most significant bits (MSBs) of channel data.

The disclosure provides a method for image compression includes: retrieving an image block including a plurality of pixels, wherein each of the pixels include a plurality of channel data; defining a plurality of root nodes according to an image compressing ratio of the image block; categorizing each of the channel data of each of the pixels into a plurality of groups corresponding to the root nodes, wherein a structure of each of the groups is a binary tree; if at least one empty tree exists in the groups, dividing at least one non-empty tree of the groups into a plurality of sub-trees and replacing the at least one empty tree and the at least one non-empty tree with the sub-trees to update the groups and the root nodes; building a center value of each of the groups and determining a group index of each of the channel data of each of the groups; and encoding the center value of each of the groups and characterizing each of the channel data as the corresponding center value and the group index to compress each of the channel data.

The disclosure provides a device for image compression including a storage circuit and a processor. The storage circuit stores a plurality of modules. The processor is coupled to the storage circuit and accesses the modules to perform steps of: retrieving an image block including a plurality of pixels, wherein each of the pixels includes a plurality of channel data; defining a plurality of root nodes according to an image compressing ratio of the image block; categorizing each of the channel data of each of the pixels into a plurality of groups corresponding to the root nodes, wherein a structure of each of the groups is a binary tree; if at least one empty tree exists in the groups, dividing at least one non-empty tree of the groups into a plurality of sub-trees and replacing the at least one empty tree and the at least one non-empty tree with the sub-trees to update the groups and the root nodes; building a center value of each of the groups and determining a group index of each of the channel data of each of the groups; encoding the center value of each of the groups and characterizing each of the channel data as the corresponding center value and the group index to compress each of the channel data.

To sum up, the method for image compression and the device using the same provided by the disclosure can categorize all the data in the image block into a plurality of groups by utilizing the binary tree principle, such that the lossless encoding of information of MSBs can be assured as much as possible to reduce errors after the data is compressed.

In order to make the aforementioned features and advantages of the disclosure more comprehensible, embodiments accompanying figures are described in details below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
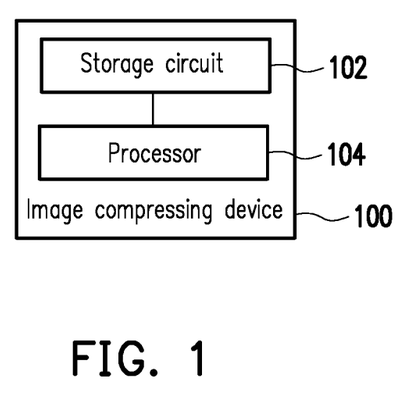
FIG. 1 is a functional block diagram illustrating an image compressing device according to an embodiment of the disclosure.

Referring to FIG. 1, FIG. 1 is a functional block diagram illustrating an image compressing device according to an embodiment of the disclosure. In the present embodiment, an image compressing device 100 includes a storage circuit 102 and a processor 104.

In different embodiments, the image compressing device 100 may be a cell phone, a personal computer (PC), a notebook PC, a netbook PC, a tablet PC, a digital camera or other similar smart devices, but the disclosure is not limited thereto.

The storage circuit 102 may be any fixed or movable random access memory (RAM), read only memory (ROM), flash memory, hard disk or other similar devices and may be used to store computer readable software, images, programming modules and other information.

The processor 104 is coupled to the storage circuit 102 and may be a general purpose processor, a special purpose processor, a typical processor, a digital signal processor (DSP), a plurality of microprocessors, one or more microprocessors integrated with a DSP core, a controller, a microcontroller, an application specific integrated circuit (ASIC), a field programmable gate array (FPGA), any other type of integrated circuit, a state machine, an advanced RISC machine-based processor or the like.

Figure 2:
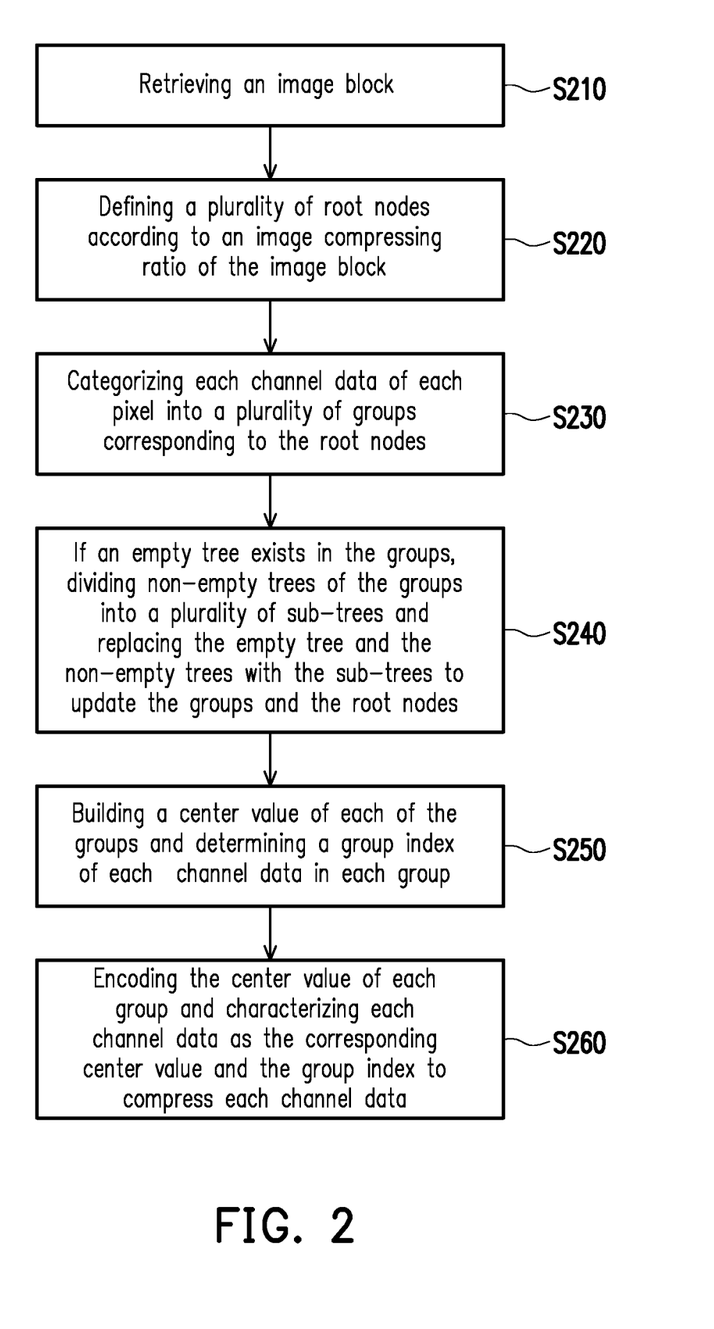
FIG. 2 is a method for image compression according to an embodiment of the disclosure.

Referring to FIG. 2, FIG. 2 is a method for image compression according to an embodiment of the disclosure. The method of the present embodiment may be performed by the image compressing device 100 illustrated in FIG. 1, and detailed steps of the method will be described with reference to each element illustrated in FIG. 1.

First, in step S210, the processor 104 may retrieve an image block. In the present embodiment, the processor 104 may, after receiving a complete image frame, divide the image frame into a plurality of image blocks having the same size. In order to describe the spirit of the disclosure, the description will be set forth based on one of the image blocks retrieved by the processor 104.

In the embodiments below, the size of the image block in consideration is assumed (but not limited) to be 8×2 (i.e., the length is 8 pixels, the width is 2 pixels, and the size is 16 pixels in total). Each pixel may have 3 pieces of channel data (respectively corresponding to R, G and B), and each channel data may include, for example, 8 bits. Under the aforementioned assumption, there are 48 (i.e., 8×2×3) pieces of channel data in total existing in one image block, and a total bit number corresponding to these 48 pieces of channel data is 384 (i.e., 48×8) (namely, a bit number required for implementing lossless compression for the aforementioned image block).

In step S220, the processor 104 may define a plurality of root nodes according to an image compressing ratio of the image block.

Figure 3A:
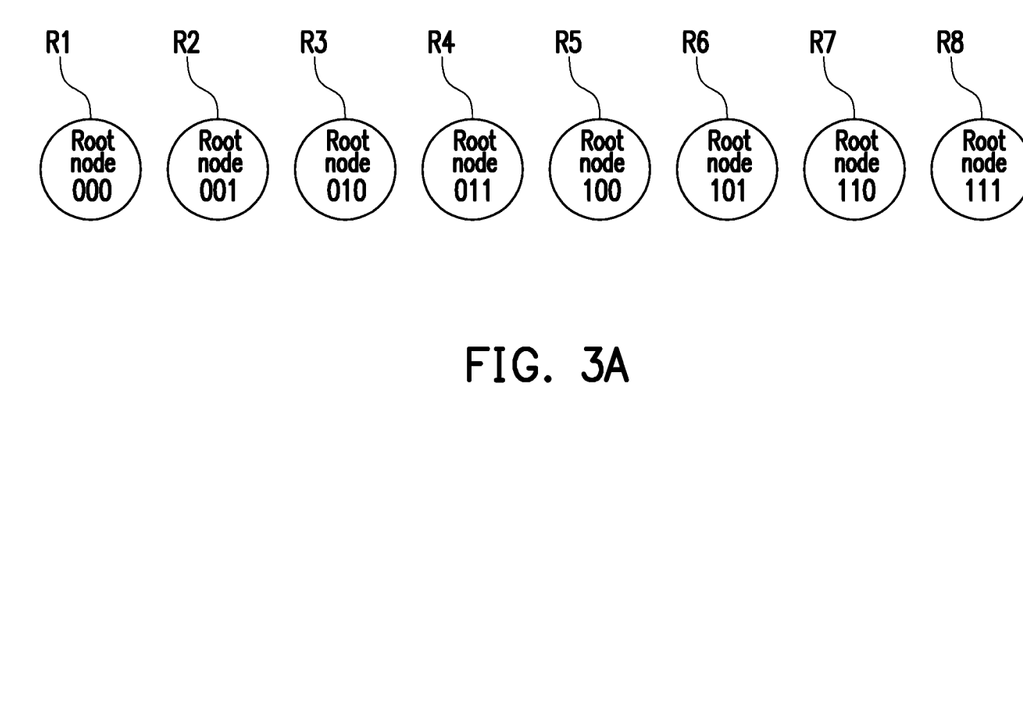
FIG. 3A is a schematic diagram illustrating defining the root nodes based on the image compressing ratio according to an embodiment of the disclosure.

Referring to FIG. 3A, FIG. 3A is a schematic diagram illustrating defining the root nodes based on the image compressing ratio according to an embodiment of the disclosure. In the present embodiment, it is assumed that the image compressing ratio used to compress the image block is 2, and the root nodes R1, R2, R3, R4, R6, R7, and R8 may respectively include 000, 001, 010, 011, 100, 101, 110 and 111, as illustrated in FIG. 3A.

In other embodiments, the image compressing ratio may be adjusted according to a designer's demand, such that the root nodes defined in this way may be present in different aspects. For example, it is assumed that the image compressing ratio used to compress the image block is 3, and the root nodes may include 00, 01, 10 and 11. In another example, it is assumed that the image compressing ratio used to compress the image block is 6, and the root nodes may include 0 and 1. However, the disclosure is not limited thereto.

In step S230, the processor 104 may categorize each channel data of each pixel into a plurality of groups corresponding to the root nodes, wherein a structure of each group is a binary tree.

Figure 3B:
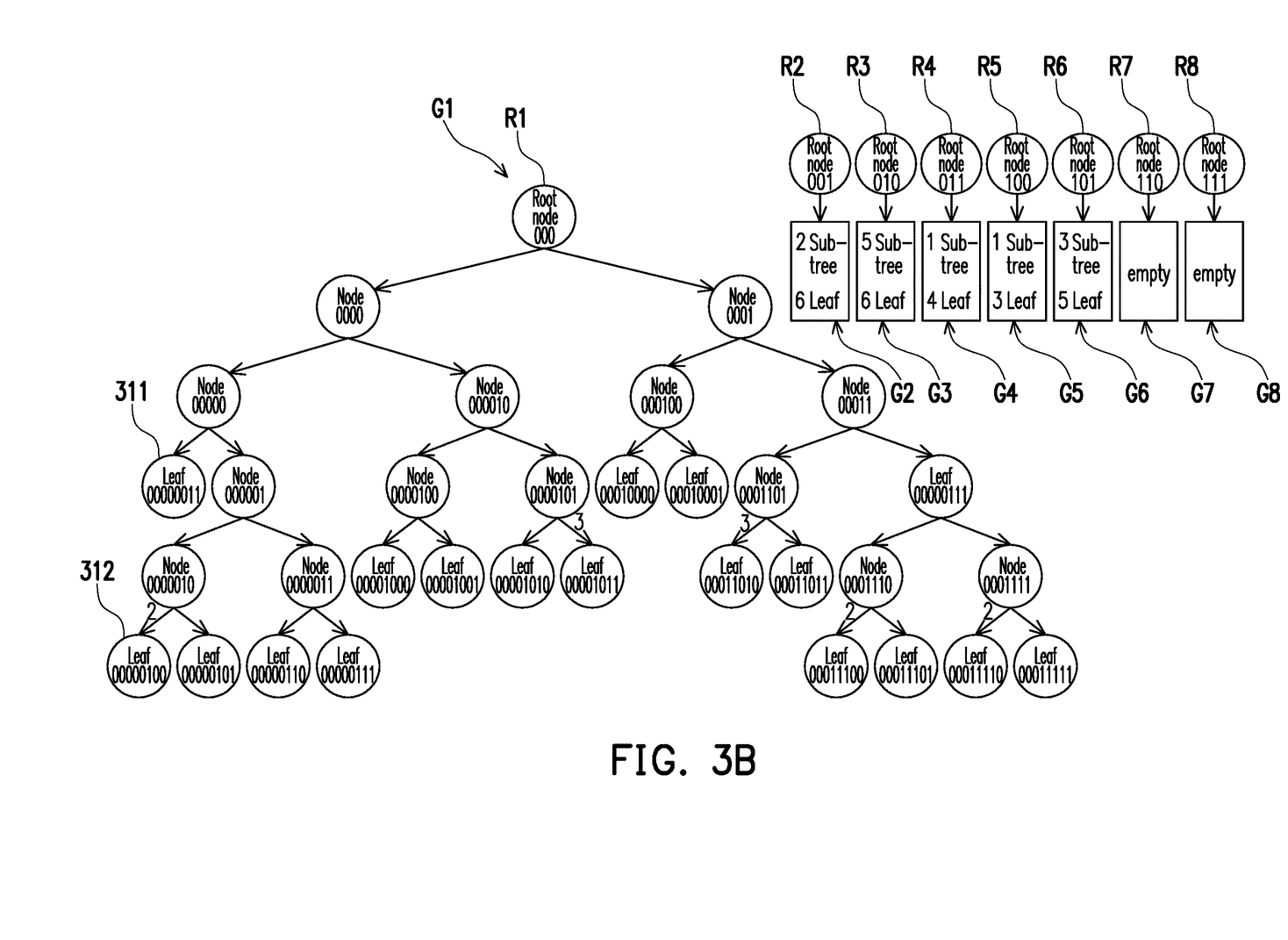
FIG. 3B is a schematic diagram illustrating categorizing each channel data into the groups corresponding to the root nodes depicted in FIG. 3A.

See FIG. 3B for further details, wherein FIG. 3B is a schematic diagram illustrating categorizing each channel data into the groups corresponding to the root nodes depicted in FIG. 3A. In the present embodiment, assuming that the 48 pieces of channel data include a piece of channel data of "00000011", the channel data, due to having 3 most significant bits (MSBs) of "000", may be categorized into a group G1 which the root node R1 (i.e., "000") belongs to, thereby forming a leaf 311 in the group G1 according to a general binary tree building principle. Moreover, assuming that the 48 pieces of channel data include 2 pieces of channel data of "00000100", the 2 pieces of channel data, due to having 3 MSBs of "000" in the same way, may be categorized into the group G1 which the root node R1 (i.e., "000") belongs to, thereby forming a leaf 312 in the group G1 according to the general binary tree building principle, wherein the arrow pointing to the leaf 312 is labeled by 2 to represent that the number of the channel data of "00000100" is 2 in total.

Moreover, if the 48 pieces of channel data include channel data having 3 MSBs of 001, 010, 011, 100, 101, 110 or 111, the channel data may correspondingly categorized into a group G2, G3, G4, G5, G6, G7 or G8 as a leaf.

As illustrated in FIG. 3B, after the 48 pieces of channel data are categorized into the groups G1-G8, exemplary aspects of the groups G1-G8 are as follows. There are 17 sub-trees and 24 leaves in total in the group G1 which the root node R1 (i.e., "000") belongs to. There are 2 sub-trees and 6 leaves in total in the group G2 which the root node R2 (i.e., "001") belongs to. There are 5 sub-trees and 6 leaves in total in the group G3 which the root node R3 (i.e., "010") belongs to. There are 1 sub-tree and 4 leaves in total in the group G4 which the root node R4 (i.e., "011") belongs to. There are 1 sub-tree and 3 leaves in total in the group G5 which the root node R5 (i.e., "100") belongs to. There are 3 sub-tree and 5 leaves in total in the group G6 which the root node R6 (i.e., "101") belongs to. The group G7 which the root node R7 (i.e., "110") belongs to and the group G8 which the root node R8 (i.e., "111") belongs, due to having no sub-trees and leaves, are empty trees.

It should be understood that regarding the groups G1-G8 generated based on other image blocks, aspects and structures thereof may vary as the 48 pieces of channel data in other image blocks vary.

In step S240, if any empty tree exists in the aforementioned groups, the processor 104 may divide non-empty trees of the groups into a plurality of sub-trees and replace the empty trees and the non-empty trees with the sub-trees to update the groups and the root nodes. In the present embodiment, each of the non-empty trees at least has a left sub-tree and a right sub-tree.

Taking FIG. 3B as an example, the non-empty trees may be, for example, the groups G1-G3 and G6. Thus, the groups G1-G3 and G6 may be divided into a plurality of sub-trees and used to replace the empty trees illustrated in FIG. 3B, i.e., the groups G7 and G8.

In an embodiment, the processor 104 may update the groups G1-G8 by the following steps. (a) A specific non-empty tree is selected from the non-empty trees. (b) The specific non-empty tree is divided into a first sub-tree and a second sub-tree. (c) The specific non-empty tree and a specific empty tree among the empty trees are replaced with the first sub-tree and the second sub-tree to update the groups G1-G8. (d) A first root node corresponding to the specific non-empty tree among root nodes R1-R8 is replaced with a root node of the first sub-tree, and a second root node corresponding to the specific empty tree among the root nodes R1-R8 is replaced with a root node of the second sub-tree to update the root nodes R1-R8. (e) Steps (a), (b), (c) and (d) are repeated until no non-empty tree exists in the groups G1-G8.

In an embodiment, the processor 104 may serve one of the non-empty trees which has a maximum number of leaves as the aforementioned specific non-empty tree. In another embodiment, if there are 2 non-empty trees simultaneously having the maximum number of leaves, the processor 104 may serve one of the non-empty trees which has a minimum number of sub-trees as the aforementioned specific non-empty tree. In other embodiments, if there are 2 non-empty trees simultaneously having the maximum number of leaves and the same number of sub-trees, the processor 104 may select one of them as the specific non-empty tree. However, the disclosure is not limited thereto.

Taking FIG. 3B as an example, because the group G1 has the maximum number of leaves (which is 24 in total) among the groups G1-G3 and G6 (i.e., the non-empty trees), the processor 104 may select the group G1 as the specific non-empty tree and may divide the group G1 into the first sub-tree and the second sub-tree.

Referring to FIG. 3B, the group G1 may be divided into the first sub-tree serving a node of "0000" as a root node and the second sub-tree serving a node of "0001" as a root node. Then, the processor 104 may replace the specific non-empty tree (i.e., the group G1) and the specific empty tree (e.g., the group G7) among the empty trees with the first sub-tree and the second sub-tree to update the groups G1-G8. Then, the processor 104 may replace a first root node (i.e., the root node R1) corresponding to the specific non-empty tree (i.e., the group G1) among the root nodes R1-R8 with the root node (i.e., "0000") of the first sub-tree and replace a second root node (i.e., the root node R7) corresponding to the specific empty tree (i.e., the group G7) among the root nodes R1-R8 with the root node (i.e., "0001") of the second sub-tree to update the root nodes R1-R8.

In another viewpoint, the aforementioned operation may be considered as first removing one of the empty trees and then selecting a larger one of the non-empty trees to categorize it into two separate binary trees, thereby creating new groups G1-G8.

Figure 3C:
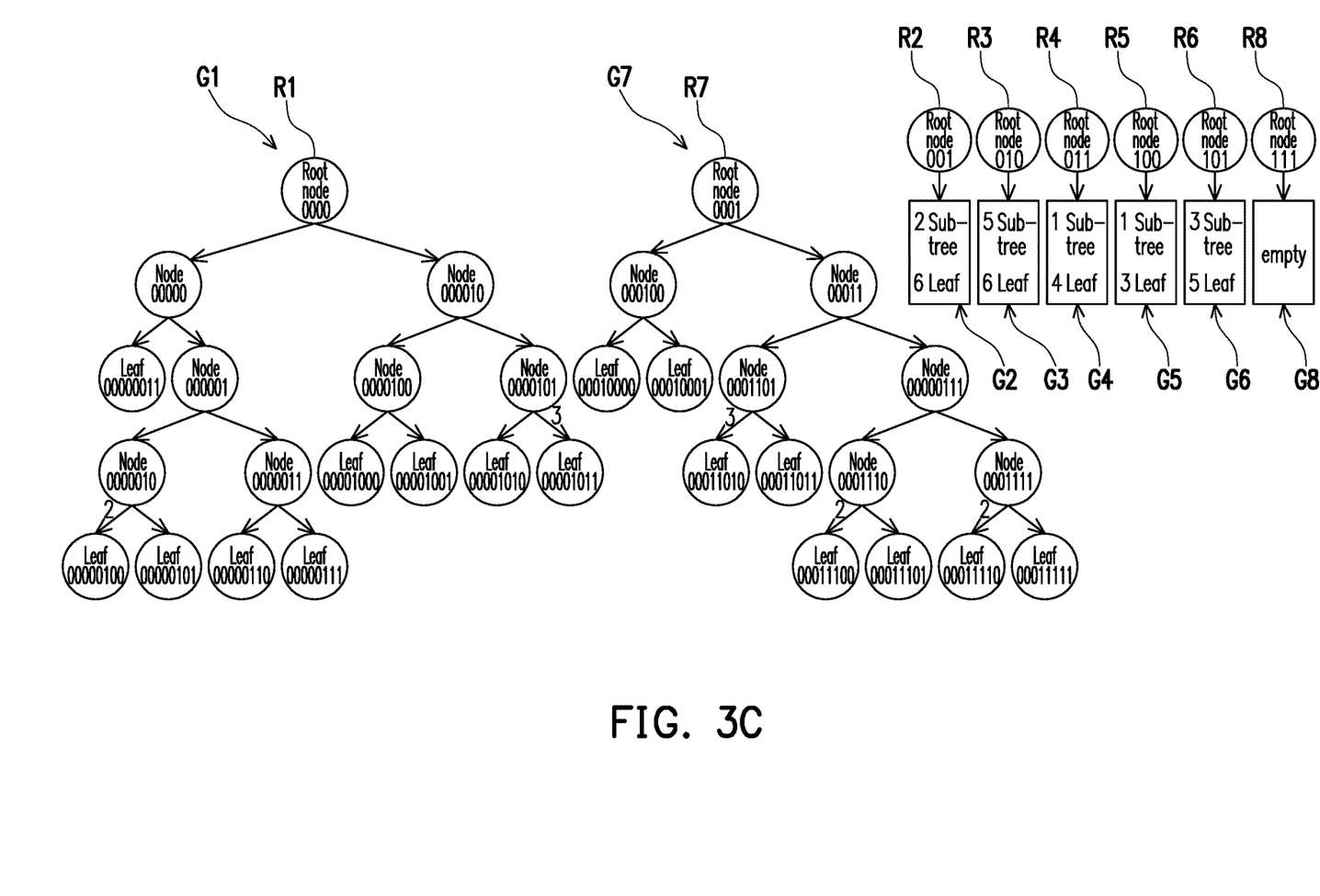
FIG. 3C is a schematic diagram illustrating the updated groups and root nodes depicted in FIG. 3B.

Referring to FIG. 3C, FIG. 3C is a schematic diagram illustrating the updated groups and root nodes depicted in FIG. 3B. As illustrated in FIG. 3C, the updated group G1 may, for example, correspond to the first sub-tree serving the node of "0000" as the root node in FIG. 3B, and the root node R1 of the group G1 may also be correspondingly updated as "0000". Similarly, the updated group G7 may, for example, correspond to the second sub-tree serving the node of "0001" as the root node in FIG. 3B, and the root node R7 of the group G7 may also be correspondingly updated as "0001".

In this circumstance, because there is still an empty tree (i.e., the group G8) existing in the aspect as illustrated in FIG. 3C, the processor 104 may again perform the aforementioned steps (a)-(b) to update the aspect as illustrated in FIG. 3C.

In particular, in FIG. 3C, because the numbers of leaves of both the groups G1 and G7 are 12, the processor 104 may select one of them which has a minimum number of sub-trees as the aforementioned specific non-empty tree. Because the group G7 has 8 sub-trees less than 9 sub-trees of the group G1, the processor 104 may select the group G7 as the aforementioned specific non-empty tree and may divide the group G71 into the first sub-tree and the second sub-tree.

Referring to FIG. 3C, the group G7 may be divided into the first sub-tree serving a node of "000100" as a root node and the second sub-tree serving a node of "00011" as a root node. Then, the processor 104 may replace the specific non-empty tree (i.e., the group G7) and a specific empty tree (e.g., the group 8) among the empty trees with the first sub-tree and the second sub-tree to update the groups G1-G8. Then, the processor 104 may replace a first root node (i.e., the root node R7) corresponding to the specific non-empty tree (i.e., the group G7) among the root nodes R1-R8 with the root node (i.e., "000100") of the first sub-tree and replace a second root node (i.e., the root node R8) corresponding to the specific empty tree (i.e., the group G8) among the root nodes R1-R8 with the root node (i.e., "00011") of the second sub-tree to update the root nodes R1-R8.

Figure 3D:
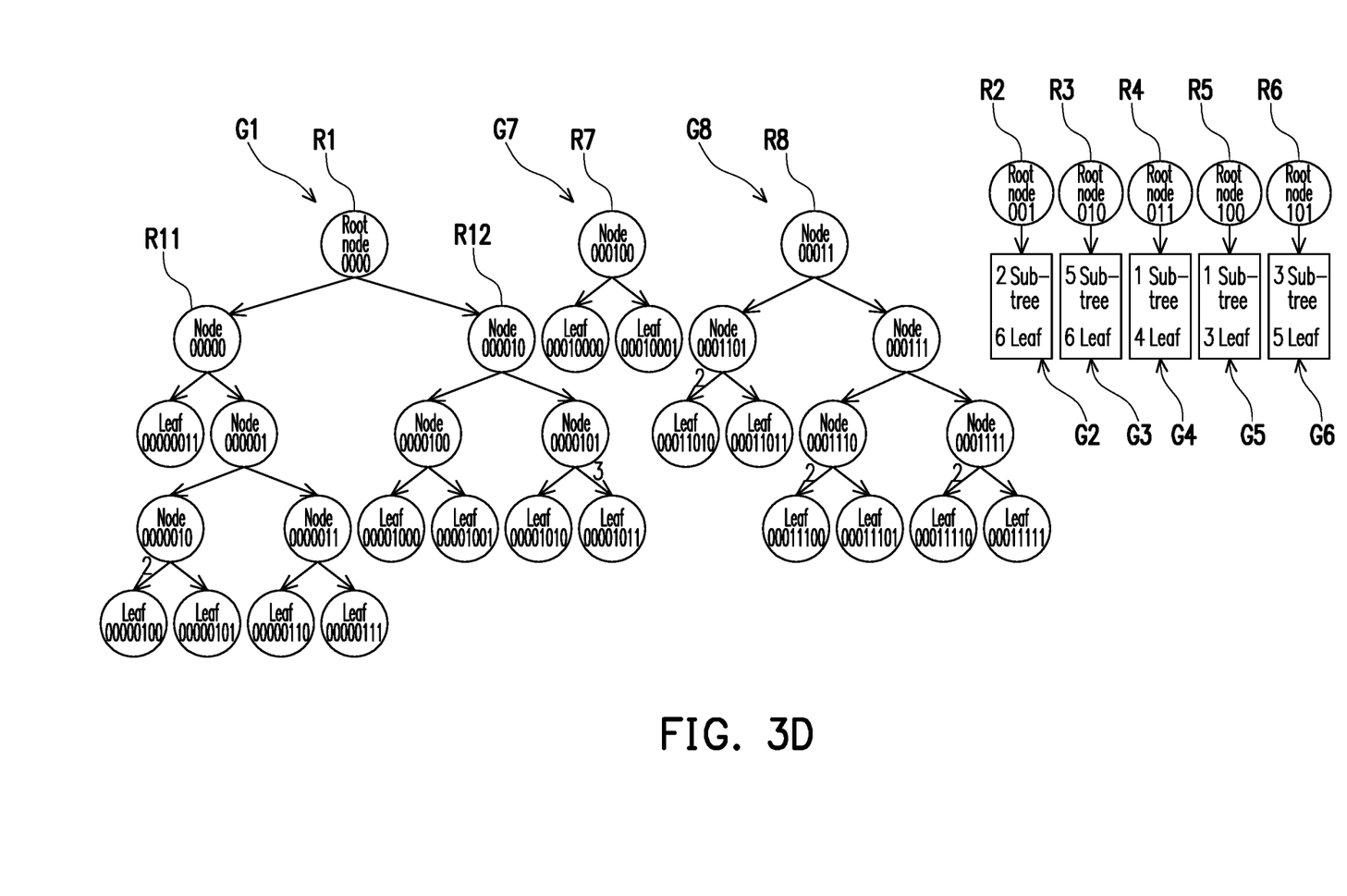
FIG. 3D is a schematic diagram illustrating the updated groups and root nodes depicted in FIG. 3C.

Referring to FIG. 3D, FIG. 3D is a schematic diagram illustrating the updated groups and root nodes depicted in FIG. 3C. As illustrated in FIG. 3D, the updated group G7 may, for example, correspond to the first sub-tree serving the node of "000100" as the root node in FIG. 3C, and the root node R7 of the group G7 may also be correspondingly updated as "000100". Similarly, the updated group G8 may, for example, correspond to the second sub-tree serving the node of "00011" as the root node in FIG. 3C, and the root node R7 of the group G8 may also be correspondingly updated as "00011".

After the groups G1-G8 are updated to have no empty trees, in step S250, the processor 104 may build a center value of each of the groups G1-G8 and determining a group index of each channel data of each group.

In an embodiment, for a specific group among the groups G1-G8, the processor 104 may retrieve a specific root node corresponding to the specific group among the root nodes R1-R8. Thereafter, the processor 104 may retrieve a specific sub-node under the specific root node.

In an embodiment, the specific sub-node has a maximum number of leaves among a plurality of sub-nodes of the specific root node. In another embodiment, the specific sub-node has a minimum number of sub-trees among the sub-nodes of the specific root node. In other embodiments, if the sub-nodes of the specific root node have the same number of leaves and the same number of sub-trees, the processor 104 may arbitrarily select one from these sub-nodes as the specific sub-node. Thereby, the selected specific sub-node may preferably exhibit data characteristics of the specific group, so as to reduce quality loss after the compression.

Then, the processor 104 may pad the specific sub-node to a specific length based on a highest bit of a difference between the specific root node and the specific sub-node. Meanwhile, the processor 104 may define the padded specific sub-node as a center value of the specific group.

Taking the group G1 as an example, the processor 104 may retrieve a specific root node (i.e., the root node R1) corresponding to the group G1 among the root nodes R1-R8 and select a specific sub-node under the root node R1. In FIG. 3D, the root node R1 has, for example, a sub-node R11 (i.e., "00000") and a sub-node R12 (i.e., "000010"), wherein even though the sub-nodes R11 and R12 have the same number (i.e., 6) of leaves, the processor 104 may select the sub-node R12 as the specific sub-node because the number (i.e., 4) of sub-trees of the sub-node R12 is less than the number (i.e., 5) of sub-trees of the sub-node R11.

Thereafter, the processor 104 may pad the sub-node R12 to a specific length based on a highest bit of a difference between the root node R1 (i.e., "0000") and the specific sub-node R12 (i.e., "000010"). In the present embodiment, the difference between the root node R1 and the sub-node R12 is "10", the highest bit is "1", and thus, the processor 104 may pad the sub-node R12 to a specific length (e.g., 8 bits) based on the highest bit.

In an embodiment, the processor 104 may use an inverted value (i.e., "0") of the highest bit to pad the sub-node R12 to 8 bits. Namely, the padded sub-node R12 is "00001000", and the processor 104 may define "00001000" (the padded sub-node R12) as a center value of the group G1.

For the groups G1-G8, the processor 104 may also obtain the center value of each of the groups G1-G8 based on the teaching set forth above, and details thereof will not repeated hereinafter.

In other embodiments, the processor 104 may determine a group index of each channel data in each of the groups G1-G8. In particular, the processor 104 may retrieve a $1^{st}$ channel data from the aforementioned 48 pieces of channel data and accordingly define a $1^{st}$ group among the groups G1-G8, wherein the $1^{st}$ group is defaulted as a group which the first channel data belongs to. Thereby, the group index of the first channel data may be omitted (i.e., the number of bits required for recording the group index is "0").

In an embodiment, the processor 104 may indicate that a $2^{nd}$ channel data among the 48 pieces of channel data is located in the $1^{st}$ group or a $2^{nd}$ group among the groups G1-G8 by using 1 bit. In particular, if the $2^{nd}$ channel data is not in the $1^{st}$ group, the $2^{nd}$ channel data may be placed in the $2^{nd}$ group. Thus, the $2^{nd}$ channel data needs 1 bit to indicate which group it belongs to.

Similarly, for a $3^{rd}$ channel data among the 48 pieces of channel data, if it is not in the $1^{st}$ group or the $2^{nd}$ group, it may be placed in a $3^{rd}$ group among the groups G1-G8. Thus, the processor 104 may indicate that the $3^{rd}$ channel data is located in the $1^{st}$ group, the $2^{nd}$ group or the $3^{rd}$ group by using 2 bits.

For a $4^{th}$ channel data among the 48 pieces of channel data, the concept is similar to the $3^{rd}$ channel data. Thus, the processor 104 may indicate that the $4^{th}$ channel data is located in the $1^{st}$ group, the $2^{nd}$ group or the $3^{rd}$ group by using 2 bits.

For $i^{th}$ channel data among the 48 pieces of channel data, the processor 104 needs 3 bits to indicate that the $i^{th}$ channel data is located in a $j^{th}$ group among the groups G1-G8, wherein i is an integer ranging between 5 and X, X is a total number (i.e., 48) of the channel data, j is an integer ranging between 1 and Y, and Y is a total number (i.e., 8) of the groups G1-G8.

Thereafter, in step S260, the processor 104 may encode the center value of each of the groups G1-G8 and characterize each channel data as the corresponding center value and the group index to compress each channel data.

In particular, in light of the foregoing, it needs 137 (i.e., 0+1+2+2+44×3) bits to completely record the group index of each of the 48 pieces of channel data. Meanwhile, in a condition that the image compressing ratio is 2, a total budget that may be used for encoding the 48 pieces of channel data is 192 (i.e., 384/2) bits. Thus, only 55 (i.e., 192-137) bits are left for encoding the center value of each of the groups G1-G8.

Accordingly, in an embodiment, for an $n^{th}$ group among the groups G1-G8, the processor 104 may represent the center value corresponding to the $n^{th}$ group by using m MSBs thereof, wherein $$m = \begin{cases} 8, & \frac{55}{n} \geq 8 \\ \frac{55}{n} + 1, & n < \mod(55, 8) \\ \frac{55}{n}, & n \geq \mod(55, 8) \end{cases} \quad \text{Formula (1)}$$

wherein n is an integer ranging between 1 and Y, and mod(a, b) is a remainder of b categorized by a.

In an embodiment, the group index used for encoding each channel data and the number of bits required for encoding the center value of each of the groups G1-G8 may be organized in Table 1 below.

TABLE 1

| Group index | $1^{st}$ group | $2^{nd}$ group | $3^{rd}$ group | $4^{th}$ group | $5^{th}$ group | $6^{th}$ group | $7^{th}$ group | $8^{th}$ group |
|---|---|---|---|---|---|---|---|---|
| 137 bits | 7-8 bits | 7-8 bits | 7-8 bits | 7-8 bits | 7-8 bits | 7-8 bits | 0/7 bits | 0/6 bits |

Furthermore, according to the teaching in the embodiments set forth above, the length of the center value of each of the groups G1-G8 should be 8 bits. However, according to Formula (1), 55 bits are not sufficient to completely represent the center value of each of the groups G1-G8 (where 64 bits in total are required), and thus, for a part of the groups G1-G8 (e.g., the $7^{th}$ or the $8^{th}$ group), the center values of the part of the groups have to be encoded by a loss encoding method. For example, the processor 104 may use 7 MSBs of the center value of the seventh group to represent the center value to encode the center value. Alternatively, the processor 104 may use 6 MSBs of the center value of the $8^{th}$ group to represent the center value to encode the center value.

After completing the encoding of the center value of each of the groups G1-G8, the processor 104 may characterize each channel data as the corresponding center value and the group index. Taking the channel data in the group G1 as an example, all of these channel data are replaced with the center value of the encoded group G1. Meanwhile, since each channel data in the group G1 has the corresponding group index according to the teaching of the embodiments set forth above, each channel data in the group G1 may be characterized as "encoded center value+group index of the group G1", thereby, achieving an effect of compressing each channel data in the group G1.

Moreover, the processor 104 may adopt the similar concept to characterize each channel data in each of the groups G1-G8, thereby achieving the effect of compressing each channel data in the groups G1-G8.

According to the teaching set forth above, in a condition that the image compressing ratio is 2, the method for image compression and the device using the same provided by the disclosure can categorize all the data in the image block into 8 groups by utilizing the binary tree principle, such that the lossless encoding of the information of MSBs can be assured as much as possible. Meanwhile, distribution characteristics of each channel data in each group have been considered during the process of building the center value of each group, so as to reduce errors after the compression. Thereby, the method of the embodiments of the disclosure can have preferable quality assurance in a condition that the difference between the data in the image block is relatively large (e.g., an image including a great amount of non-Chinese characters). Meanwhile, through experiments, a peak signal to noise ratio (PSNR) of the image block may be increased by about 1% to 7% by using the method for image compression of the disclosure.

Those of ordinary skills in the present art should understand that although the description is set forth by using a single image block in the embodiments above, the teaching may also be applied in other image blocks in the aforementioned image frame, and details thereof will not repeated hereinafter.

Figure 4:
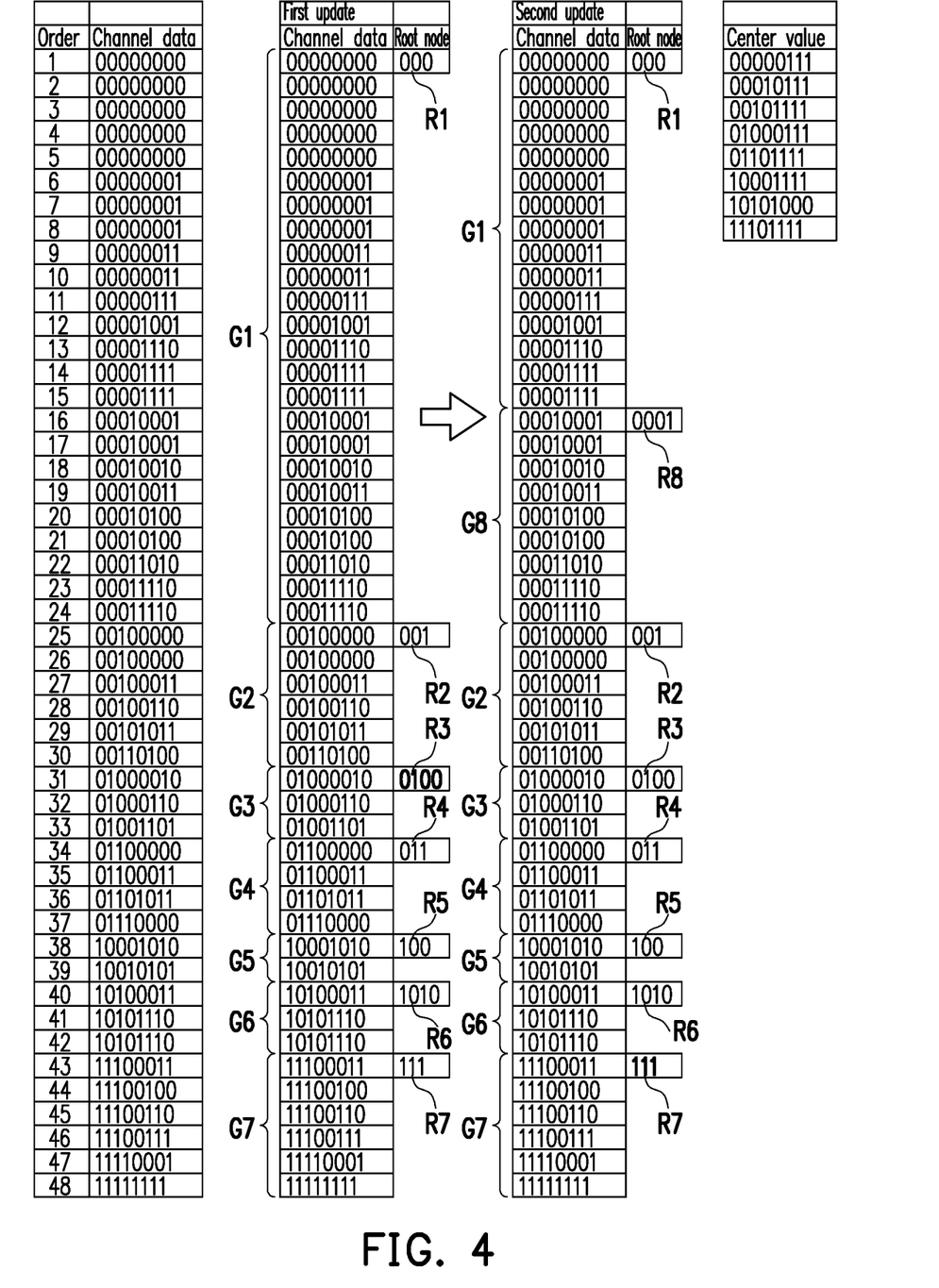
FIG. 4 is a schematic diagram illustrating updating the groups and accordingly building the center value according to an embodiment of the disclosure.

To make the concepts of the disclosure more clear, another embodiment is provided for description below. Referring to FIG. 4, FIG. 4 is a schematic diagram illustrating updating the groups and accordingly building the center value according to an embodiment of the disclosure. In the present embodiment, the 48 pieces of channel data in the image block are sequentially listed at the leftmost side in FIG. 4, and these channel data may be categorized into groups of corresponding root nodes based on the teaching set forth above. Thereafter, after being updated for the first time, the groups may be updated as groups G1-G7 as illustrated respectively corresponding to root nodes R1-R7. In other words, after the first update is performed, there is still an empty tree. Correspondingly, the processor 104 may again perform the update for the second time to update the groups G1-G7 as the groups G1-G8 as illustrated (respectively corresponding to root nodes R1-R8).

After the second update is performed, since there is no longer any empty tree, the processor 104 may build the center value of each of the groups G1-G8 based on the teaching set forth above. In the present embodiment, the center value of the group G1 is, for example, "00000111", namely, the $1^{st}$ channel data through the $15^{th}$ channel data are replaced by this center value. The center value of the group G2 is, for example, "00010111", namely, the $16^{th}$ channel data through the $24^{th}$ channel data are replaced by this center value. The center value of the group G3 is, for example, "00101111", namely, the $25^{th}$ channel data through the $30^{th}$ channel data are replaced by this center value. The center value of the group G4 is, for example, "01000111", namely, the $31^{st}$ channel data through the $33^{rd}$ channel data are replaced by this center value. The center value of the group G5 is, for example, "0110111", namely, the $34^{th}$ channel data through the $37^{th}$ channel data are replaced by this center value. The center value of the group G6 is, for example, "10001111", namely, the $38^{th}$ channel data through the $39^{th}$ channel data are replaced by this center value. The center value of the group G7 is, for example, "10101000", namely, the $40^{th}$ channel data through the 42th channel data are replaced by this center value. The center value of the group G8 is, for example, "11101111", namely, the $43^{rd}$ channel data through the $48^{th}$ channel data are replaced by this center value.

Thereafter, the processor 104 may encode each of the aforementioned center values and characterize each channel data together with the group index of each of the 48 pieces of channel data in an aspect of "encoded center value+group index", thereby achieving the effect of compression.

In an embodiment, if the image compressing ratio in consideration is 3, a total budget that may be used for encoding the 48 pieces of channel data in the image block is 128 (i.e., 384/3) bits. Correspondingly, the processor 104 may categorize the aforementioned 48 pieces of channel data into 4 groups. Meanwhile, the processor 104 may retrieve a $1^{st}$ channel data from the aforementioned 48 pieces of channel data, and accordingly define a $1^{st}$ group among the 4 groups, wherein the $1^{st}$ group is defaulted as a group which the $1^{st}$ channel data belongs to. In this way, a group index of the $1^{st}$ channel data may be omitted (i.e., the number of bits required for recording the group index of the $1^{st}$ channel data is 0).

Meanwhile, the processor 104 may indicate that a $2^{nd}$ channel data among the 48 pieces of channel data is located in the $1^{st}$ group or a $2^{nd}$ group among the 4 groups by using 1 bit. In particular, if the $2^{nd}$ channel data is not in the $1^{st}$ group, the $2^{nd}$ channel data is placed in the $2^{nd}$ group. Thus, it needs 1 bit to indicate which group the $2^{nd}$ channel data belongs to.

For $i^{th}$ channel data among the 48 pieces of channel data, the processor 104 needs 2 bits to indicate that the $i^{th}$ channel data is located in a $j^{th}$ group among the 4 groups, wherein i is an integer ranging between 3 and X, X is a total number (i.e., 48) of the channel data, j is an integer ranging between 1 and Y, and Y is a total number (i.e., 4) of the 4 groups.

In light of the foregoing, it needs 93 (i.e., 0+1+2×46) bits in total to completely record the group index of each of the 48 pieces of channel data. Thus, only 35 (i.e., 128-93) bits are left for encoding the center values of the 4 groups. However, as only 32 bits are required for encoding the center values of the 4 groups, for an $n^{th}$ group among the 4 groups, the processor 104 may perform the lossless encoding on the center value corresponding to the $n^{th}$ group, wherein n is an integer ranging between 1 and Y.

Similarly, in another embodiment, in the image compressing ratio in consideration is 6, a total budget that may be used for encoding the 48 pieces of channel data in the image block is 64 (i.e., 384/6) bits. Correspondingly, the processor 104 may categorize the aforementioned 48 pieces of channel data into 2 groups. Meanwhile, the processor 104 may retrieve a $1^{st}$ channel data from the aforementioned 48 pieces of channel data, so as to define a $1^{st}$ group of the 2 groups, wherein the $1^{st}$ group is defaulted as a group which the $1^{st}$ channel data belongs to. Thereby, a group index of the $1^{st}$ channel data may be omitted (i.e., the number of bits required for recording the group index of the $1^{st}$ channel data is 0).

For $i^{th}$ channel data among the 48 pieces of channel data, the processor 104 needs 2 bits to indicate that the $i^{th}$ channel data is located in a $j^{th}$ group of the 2 groups, wherein i is an integer ranging between 2 and X, X is a total number (i.e., 48) of the channel data, j is an integer ranging between 1 and Y, and Y is a total number (i.e., 2) of the 2 groups.

In light of the foregoing, it needs 47 (i.e., 0+1+2×47) bits in total to completely record the group index of each of the 48 pieces of channel data. Thus, only 17 (i.e., 64-47) bits are left for encoding the center values of the 2 groups. However, as it needs only 16 bits to encode the center values of the 2 groups, for an $n^{th}$ group of the 2 groups, the processor 104 may perform the lossless encoding on the center value corresponding to the $n^{th}$ group, wherein n is an integer ranging between 1 and Y.

Based on the above, the method for image compression and the device using the same provided by the disclosure can categorize all the data in the image block into a plurality of groups based on the binary tree principle and the image compressing ratio in consideration, such that the lossless encoding of the information of the MSBs can be assured as much as possible. Meanwhile, the distribution characteristics of the channel data in each group have also been considered during the process of building the center value of each group, so as to reduce the errors after the compression. In this way, the method of the embodiments of the disclosure can obtain preferable quality assurance in a condition that the difference between the data in the image block is relatively large.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for image compression, comprising: retrieving an image block including a plurality of pixels, wherein each of the pixels comprises a plurality of channel data; defining a plurality of root nodes according to an image compressing ratio of the image block; categorizing each of the channel data of each of the pixels into a plurality of groups corresponding to the root nodes, wherein a structure of each of the groups is a binary tree; wherein at least one empty tree exists in the groups, dividing at least one non-empty tree of the groups into a plurality of sub-trees and replacing the at least one empty tree and the at least one non-empty tree with the sub-trees to update the groups and the root nodes, wherein each of the at least one non-empty tree at least has a left sub-tree and a right sub-tree; building a center value of each of the groups and determining a group index of each of the channel data in each of the groups; and encoding the center value of each of the groups and characterizing each of the channel data as the corresponding center value and the group index to compress each of the channel data.

2. The method according to claim 1, wherein the image compressing ratio is 2, and the root nodes comprise 000, 001, 010, 011, 100, 101, 110 and 111.

3. The method according to claim 2, wherein if 3 most significant bits (MSBs) of a specific pixel among the pixels are identical to those of a specific root node among the root nodes, the specific pixel is categorized into a specific group corresponding to the specific root node among the groups.

4. The method according to claim 1, wherein the image compressing ratio is 3, and the root nodes comprise 00, 01, 10 and 11.

5. The method according to claim 4, wherein if 2 MSBs of a specific pixel among the pixels are identical to those of a specific root node among the nodes, the specific pixel is categorized into a specific group corresponding to the specific root node among the groups.

6. The method according to claim 1, wherein the step of categorizing the at least one non-empty tree of the groups into the sub-trees and replacing the at least one empty tree and the at least one non-empty tree with the sub-trees comprises:
   (a) selecting a specific non-empty tree from the at least one non-empty tree;
   (b) dividing the specific non-empty tree into a first sub-tree and a second sub-tree;
   (c) replacing the specific non-empty tree and a specific empty tree among the at least one empty tree with the first sub-tree and the second sub-tree to update the groups;
   (d) replacing a first root node corresponding to the specific non-empty tree among the root nodes with a root node of the first sub-tree and replacing a second root node corresponding to the specific empty tree among the root nodes with a root node of the second sub-tree to update the root nodes; and
   (e) repeating (a), (b), (c) and (d) until no non-empty tree exists in the groups.

7. The method according to claim 6, wherein the specific non-empty tree has a maximum number of leaves among the at least one non-empty tree.

8. The method according to claim 7, wherein if a plurality of the specific non-empty trees exist, one of the specific non-empty trees which has a minimum number of sub-trees is divided into the first sub-tree and the second sub-tree.

9. The method according to claim 8, wherein if the specific non-empty trees have the same number of sub-trees, one is arbitrarily selected from the specific non-empty trees and divided into the first sub-tree and the second sub-tree.

10. The method according to claim 1, wherein the step of building the center value of each of the groups comprises:
    for a specific group among the groups, retrieving a specific root node corresponding to the specific group among the root nodes;
    selecting a specific sub-node under the specific root node;
    padding the specific sub-node to a specific length based on a highest bit of a difference between the specific root node and the specific sub-node; and
    defining the padded specific sub-node as the center value of the specific group.

11. The method according to claim 10, wherein the specific sub-node has a maximum number of leaves among a plurality of sub-nodes of the specific root node.

12. The method according to claim 11, wherein the specific sub-node has a minimum number of sub-trees among the sub-nodes of the specific root node.

13. The method according to claim 12, wherein if the sub-nodes of the specific root node has the same number of leaves and the same number of sub-trees, one is arbitrarily selected from the sub-nodes as the specific sub-node.

14. The method according to claim 10, wherein if the highest bit is a first value, at least one second value is padded after the specific sub-node to pad the specific sub-node to the specific length, wherein the first value is inverted to each of the at least one second value.

15. The method according to claim 10, wherein the specific length is 8 bits.

16. The method according to claim 1, wherein the step of determining the group index of each of the channel data in each of the groups comprises:
    retrieving a $1^{st}$ channel data among the plurality of channel data and accordingly define a $1^{st}$ group among the groups, wherein the $1^{st}$ group is defaulted as a group which the first channel data belongs to; and
    indicating that a $2^{nd}$ channel data among the plurality of channel data is located in the $1^{st}$ group or a $2^{nd}$ group among the groups by using 1 bit.

17. The method according to the claim 16, further comprising:
    indicating that a $3^{rd}$ channel data among the plurality of channel data is located in the $1^{st}$ group, the $2^{nd}$ group or a $3^{rd}$ group among the groups by using 2 bits; and
    indicating that a $4^{th}$ channel data among the plurality of channel data is located in the $1^{st}$ group, the $2^{nd}$ group or the $3^{rd}$ group by using 2 bits.

18. The method according to the claim 17, further comprising:
    indicating that an $i^{th}$ channel data among the plurality of channel data is located in a $j^{th}$ group by using 3 bits, wherein i is an integer ranging between 5 and X, X is a total number of the plurality of channel data, j is an integer ranging between 1 and Y, and Y is a total number of the groups.

19. The method according to claim 1, wherein when the number of the pixels in the image block is 16, the number of the channel data of each of the pixels is 3, and the image compressing ratio is 2, the step of encoding the center value of each of the groups comprises:
  for an $n^{th}$ group among the groups, representing the center value corresponding to the $n^{th}$ group by using m MSBs thereof, wherein $$m = \begin{cases} 8, & \frac{55}{n} \geq 8 \\ \frac{55}{n}+1, & n < \mod(55, 8), \\ \frac{55}{n}, & n \geq \mod(55, 8) \end{cases}$$

wherein i is an integer ranging between 1 and X, and Y is a total number of the groups, and mod(a, b) is a remainder of b categorized by a.

20. The method according to claim 1, wherein when the number of the pixels in the image block is 16, the number of the channel data of each of the pixels is 3, and the image compressing ratio is 3 or 6, the step of encoding the center value of each of the groups comprises:
  for an $n^{th}$ group among the groups, performing lossless encoding on the center value corresponding to the $n^{th}$ group, wherein n is an integer ranging between 1 and Y, and Y is a total number of the groups.

21. A device for image compression, comprising: a storage circuit, storing a plurality of modules; and a processor, coupled to the storage circuit and accessing the modules to perform steps of: retrieving an image block including a plurality of pixels, wherein each of the pixels comprises a plurality of channel data; defining a plurality of root nodes according to an image compressing ratio of the image block; categorizing each of the channel data of each of the pixels into a plurality of groups corresponding to the root nodes, wherein a structure of each of the groups is a binary tree; wherein at least one empty tree exists in the groups, dividing at least one non-empty tree of the groups into a plurality of sub-trees and replacing the at least one empty tree and the at least one non-empty tree with the sub-trees to update the groups and the root nodes, wherein each of the at least one non-empty tree at least has a left sub-tree and a right sub-tree; building a center value of each of the groups and determining a group index of each of the channel data in each of the groups; and encoding the center value of each of the groups and characterizing each of the channel data as the corresponding center value and the group index to compress each of the channel data.

22. The device according to claim 21, wherein the image compressing ratio is 2, and the root nodes comprise 000, 001, 010, 011, 100, 101, 110 and 111.

23. The device according to claim 22, wherein if 3 MSBs of a specific pixel among the pixels are identical to those of a specific root node among the nodes, the specific pixel is categorized into a specific group corresponding to the specific root node among the groups.

24. The device according to claim 21, wherein the image compressing ratio is 3, and the root nodes comprise 00, 01, 10 and 11.

25. The device according to claim 24, wherein if 2 MSBs of a specific pixel among the pixels are identical to those of a specific root node among the nodes, the specific pixel is categorized into a specific group corresponding to the specific root node among the groups.

26. The device according to claim 21, wherein the processor is configured to:
  (a) select a specific non-empty tree from the at least one non-empty tree;
  (b) divide the specific non-empty tree into a first sub-tree and a second sub-tree;
  (c) replace the specific non-empty tree and a specific empty tree among the at least one empty tree with the first sub-tree and the second sub-tree to update the groups;
  (d) replace a first root node corresponding to the specific non-empty tree among the root nodes with a root node of the first sub-tree and replace a second root node corresponding to the specific empty tree among the root nodes with a root node of the second sub-tree to update the root nodes; and
  (e) repeat (a), (b), (c) and (d) until no non-empty tree exists in the groups.

27. The device according to claim 26, wherein the specific non-empty tree has a maximum number of leaves among the at least one non-empty tree.

28. The device according to claim 27, wherein if a plurality of the specific non-empty trees exist, one of the specific non-empty trees which has a minimum number of sub-trees is divided into the first sub-tree and the second sub-tree.

29. The device according to claim 28, wherein if the specific non-empty trees have the same number of sub-trees, one is arbitrarily selected from the specific non-empty trees and divided into the first sub-tree and the second sub-tree.

30. The device according to claim 21, wherein the processor is configured to:
  for a specific group among the groups, retrieve a specific root node corresponding to the specific group among the root nodes;
  retrieve a specific sub-node under the specific root node;
  pad the specific sub-node to a specific length based on a highest bit of a difference between the specific root node and the specific sub-node; and
  define the padded specific sub-node as the center value of the specific group.

31. The device according to claim 30, wherein the specific sub-node has a maximum number of leaves among a plurality of sub-nodes of the specific root node.

32. The device according to claim 31, wherein the specific sub-node has a minimum number of sub-trees among the sub-nodes of the specific root node.

33. The device according to claim 32, wherein if the sub-nodes of the specific root node has the same number of leaves and the same number of sub-trees, one arbitrarily selected from the sub-nodes as the specific sub-node.

34. The device according to claim 30, wherein if the highest bit is a first value, at least one second value is padded after the specific sub-node to pad the specific sub-node to the specific length, wherein the first value is inverted to each of the at least one second value.

35. The device according to claim 30, wherein the specific length is 8 bits.

36. The device according to claim 31, wherein the processor is configured to:
  retrieve a 1st channel data among the plurality of channel data and accordingly define a $1^{st}$ group among the groups, wherein the $1^{st}$ group is defaulted as a group which the $1^{st}$ channel data belongs to; and indicate that a $2^{nd}$ channel data among the plurality of channel data is located in the $1^{st}$ group or a $2^{nd}$ group by using 1 bit.

37. The device according to claim 36, wherein the processor is further configured to:
   indicate that a $3^{rd}$ channel data among the plurality of channel data is located in the $1^{st}$ group, the $2^{nd}$ group or a $3^{rd}$ group among the groups by using 2 bits; and
   indicate that a $4^{th}$ channel data among the plurality of channel data is located in the $1^{st}$ group, the $2^{nd}$ group or the $3^{rd}$ group by using 2 bits.

38. The device according to claim 37, wherein the processor is further configured to:
   indicate that $i^{th}$ channel data among the plurality of channel data is located in a $j^{th}$ group by using 3 bits, wherein i is an integer ranging between 5 and X, X is a total number of the plurality of channel data, j is an integer ranging between 1 and Y, and Y is a total number of the groups.

39. The device according to claim 21, wherein when the number of the pixels in the image block is 16, the number of the channel data of each of the pixels is 3, and the image compressing ratio is 2, the processor is configured to:
   for an $n^{th}$ group among the groups, represent the center value corresponding to the $n^{th}$ group by using m MSBs thereof, wherein $$m = \begin{cases} 8, & \dfrac{55}{n} \geq 8 \\ \dfrac{55}{n} + 1, & n < \mod(55, 8), \\ \dfrac{55}{n}, & n \geq \mod(55, 8) \end{cases}$$

wherein i is an integer ranging between 1 and X, and Y is a total number of the groups, and mod(a, b) is a remainder of b categorized by a.

40. The device according to claim 21, wherein when the number of the pixels in the image block is 16, the number of the channel data of each of the pixels is 3, and the image compressing ratio is 3 or 6, the processor is configured to:
   for an $n^{th}$ group among the groups, perform lossless encoding on the center value corresponding to the $n^{th}$ group, wherein n is an integer ranging between 1 and Y, and Y is a total number of the groups.

* * * * *